US008352930B1

(12) United States Patent
Sebes et al.

(10) Patent No.: US 8,352,930 B1
(45) Date of Patent: Jan. 8, 2013

(54) SOFTWARE MODIFICATION BY GROUP TO MINIMIZE BREAKAGE

(75) Inventors: E. John Sebes, Menlo Park, CA (US); Jay Vaishnav, Cupertino, CA (US)

(73) Assignee: McAfee, Inc., Santa Clara, CA (US)

( * ) Notice: Subject to any disclaimer, the term of this patent is extended or adjusted under 35 U.S.C. 154(b) by 1507 days.

(21) Appl. No.: 11/379,953

(22) Filed: Apr. 24, 2006

(51) Int. Cl.
*G06F 9/44* (2006.01)
*G06F 9/445* (2006.01)
*G06F 17/28* (2006.01)

(52) U.S. Cl. ........ 717/168; 717/170; 717/171; 717/174; 717/177; 704/4

(58) Field of Classification Search .................. None
See application file for complete search history.

(56) References Cited

U.S. PATENT DOCUMENTS

| | | | |
|---|---|---|---|
| 4,688,169 A | 8/1987 | Joshi ............................ | 364/200 |
| 4,982,430 A | 1/1991 | Frezza et al. .................... | 380/50 |
| 5,155,847 A * | 10/1992 | Kirouac et al. ............... | 709/221 |
| 5,222,134 A | 6/1993 | Waite et al. ...................... | 380/4 |
| 5,390,314 A | 2/1995 | Swanson ........................ | 395/500 |
| 5,521,849 A | 5/1996 | Adelson et al. ................. | 364/570 |
| 5,560,008 A | 9/1996 | Johnson et al. ................. | 395/650 |
| 5,699,513 A | 12/1997 | Feigen et al. ............. | 395/187.01 |
| 5,778,349 A | 7/1998 | Okonogi ........................... | 707/1 |
| 5,787,427 A | 7/1998 | Benantar et al. | |
| 5,842,017 A | 11/1998 | Hookway et al. .............. | 395/707 |
| 5,907,709 A | 5/1999 | Cantey et al. .................. | 395/705 |
| 5,974,149 A | 10/1999 | Leppek | |
| 5,987,610 A | 11/1999 | Franczek et al. | |
| 5,987,611 A | 11/1999 | Freund | |
| 5,991,881 A | 11/1999 | Conklin et al. | |
| 6,073,142 A | 6/2000 | Geiger et al. | |
| 6,192,401 B1 * | 2/2001 | Modiri et al. ................. | 709/220 |
| 6,192,475 B1 | 2/2001 | Wallace | |
| 6,256,773 B1 * | 7/2001 | Bowman-Amuah .......... | 717/121 |

(Continued)

FOREIGN PATENT DOCUMENTS

EP   1 482 394 A2   12/2004

(Continued)

OTHER PUBLICATIONS

Myung-Sup Kim et al., "A load cluster management system using SNMP and web", [Online], May 2002, pp. 367-378, [Retrived from Internet on Oct. 24, 2012], <http://onlinelibrary.wiley.com/doi/10.1002/nem.453/pdf>.*

(Continued)

*Primary Examiner* — Thuy Dao
*Assistant Examiner* — Ziaul A Chowdhury
(74) *Attorney, Agent, or Firm* — Patent Capital Group

(57) ABSTRACT

A method is employed to group computers to facilitate application of a software modification to the computers. The method includes identifying a global set of computers to which it is desired to apply the software modification. Based on characteristics of software configurations of the computers of the identified global set, the computers of the identified global set are grouped into a plurality of clusters. Grouping the computers into a plurality of clusters includes processing syntactic information about the computers to identify the plurality of clusters and applying the software modification to the computers of the clusters. The software modification is applied with an adjustment for each cluster in an attempt to avoid software breakage of the computers of that cluster.

13 Claims, 3 Drawing Sheets

U.S. PATENT DOCUMENTS

| | | | |
|---|---|---|---|
| 6,275,938 B1 | 8/2001 | Bond et al. | 713/200 |
| 6,356,957 B2 | 3/2002 | Sanchez, II et al. | 709/328 |
| 6,393,465 B2 | 5/2002 | Leeds | 709/207 |
| 6,442,686 B1 | 8/2002 | McArdle et al. | |
| 6,449,040 B1* | 9/2002 | Fujita | 356/319 |
| 6,453,468 B1* | 9/2002 | D'Souza | 717/168 |
| 6,460,050 B1 | 10/2002 | Pace et al. | |
| 6,662,219 B1* | 12/2003 | Nishanov et al. | 709/220 |
| 6,748,534 B1 | 6/2004 | Gryaznov et al. | |
| 6,769,008 B1* | 7/2004 | Kumar et al. | 709/201 |
| 6,769,115 B1 | 7/2004 | Oldman | 717/126 |
| 6,795,966 B1 | 9/2004 | Lim et al. | |
| 6,832,227 B2 | 12/2004 | Seki et al. | 707/101 |
| 6,834,301 B1 | 12/2004 | Hanchett | |
| 6,847,993 B1* | 1/2005 | Novaes et al. | 709/221 |
| 6,907,600 B2 | 6/2005 | Neiger et al. | |
| 6,930,985 B1 | 8/2005 | Rathi et al. | |
| 6,934,755 B1 | 8/2005 | Saulpaugh et al. | |
| 6,988,101 B2 | 1/2006 | Ham et al. | 707/10 |
| 7,010,796 B1 | 3/2006 | Strom et al. | |
| 7,024,548 B1 | 4/2006 | O'Toole, Jr. | |
| 7,039,949 B2 | 5/2006 | Cartmell et al. | |
| 7,069,330 B1 | 6/2006 | McArdle et al. | |
| 7,082,456 B2 | 7/2006 | Mani-Meitav et al. | |
| 7,093,239 B1 | 8/2006 | van der Made | |
| 7,139,916 B2 | 11/2006 | Billingsley et al. | 713/182 |
| 7,152,148 B2 | 12/2006 | Williams et al. | |
| 7,251,655 B2 | 7/2007 | Kaler et al. | |
| 7,290,266 B2 | 10/2007 | Gladstone et al. | |
| 7,346,781 B2 | 3/2008 | Cowle et al. | |
| 7,350,204 B2 | 3/2008 | Lambert et al. | |
| 7,353,501 B2 | 4/2008 | Tang et al. | |
| 7,363,022 B2 | 4/2008 | Whelan et al. | |
| 7,370,360 B2 | 5/2008 | van der Made | |
| 7,441,265 B2 | 10/2008 | Staamann et al. | |
| 7,464,408 B1 | 12/2008 | Shah et al. | |
| 7,506,155 B1 | 3/2009 | Stewart et al. | |
| 7,506,170 B2 | 3/2009 | Finnegan | |
| 7,546,333 B2 | 6/2009 | Alon et al. | |
| 7,546,594 B2* | 6/2009 | McGuire et al. | 717/168 |
| 7,607,170 B2 | 10/2009 | Chesla | |
| 7,657,599 B2 | 2/2010 | Smith | |
| 7,669,195 B1* | 2/2010 | Qumei | 717/170 |
| 7,685,635 B2 | 3/2010 | Vega et al. | |
| 7,698,744 B2 | 4/2010 | Fanton et al. | |
| 7,703,090 B2* | 4/2010 | Napier et al. | 717/168 |
| 7,757,269 B1 | 7/2010 | Roy-Chowdhury et al. | |
| 7,765,538 B2* | 7/2010 | Zweifel et al. | 717/168 |
| 7,809,704 B2 | 10/2010 | Surendran et al. | |
| 7,823,148 B2* | 10/2010 | Deshpande et al. | 717/174 |
| 7,836,504 B2 | 11/2010 | Ray et al. | |
| 7,908,653 B2 | 3/2011 | Brickell et al. | |
| 7,937,455 B2* | 5/2011 | Saha et al. | 709/220 |
| 8,015,563 B2 | 9/2011 | Araujo et al. | |
| 2002/0002704 A1* | 1/2002 | Davis et al. | 717/11 |
| 2002/0069367 A1 | 6/2002 | Tindal et al. | |
| 2002/0083175 A1 | 6/2002 | Afek et al. | |
| 2002/0099671 A1 | 7/2002 | Crosbie et al. | 705/500 |
| 2003/0014667 A1 | 1/2003 | Kolichtchak | |
| 2003/0023736 A1 | 1/2003 | Abkemeier | |
| 2003/0033510 A1 | 2/2003 | Dice | |
| 2003/0037094 A1* | 2/2003 | Douceur et al. | 709/201 |
| 2003/0073894 A1 | 4/2003 | Chiang et al. | 600/407 |
| 2003/0074552 A1 | 4/2003 | Olkin et al. | 713/150 |
| 2003/0110280 A1* | 6/2003 | Hinchliffe et al. | 709/232 |
| 2003/0120601 A1 | 6/2003 | Ouye et al. | |
| 2003/0120811 A1 | 6/2003 | Hanson et al. | |
| 2003/0120935 A1 | 6/2003 | Teal et al. | 713/188 |
| 2003/0145232 A1 | 7/2003 | Poletto et al. | |
| 2003/0163718 A1 | 8/2003 | Johnson et al. | |
| 2003/0167399 A1 | 9/2003 | Audebert et al. | |
| 2003/0221190 A1* | 11/2003 | Deshpande et al. | 717/171 |
| 2004/0003258 A1 | 1/2004 | Billingsley et al. | |
| 2004/0015554 A1 | 1/2004 | Wilson | 709/206 |
| 2004/0051736 A1 | 3/2004 | Daniell | 345/752 |
| 2004/0054928 A1 | 3/2004 | Hall | |
| 2004/0143749 A1 | 7/2004 | Tajalli et al. | |
| 2004/0167906 A1* | 8/2004 | Smith et al. | 707/100 |
| 2004/0230963 A1 | 11/2004 | Rothman et al. | 717/168 |
| 2004/0243678 A1 | 12/2004 | Smith et al. | |
| 2004/0255161 A1 | 12/2004 | Cavanaugh | 713/201 |
| 2005/0018651 A1 | 1/2005 | Yan et al. | 370/352 |
| 2005/0086047 A1* | 4/2005 | Uchimoto et al. | 704/4 |
| 2005/0097147 A1* | 5/2005 | Hunt et al. | 707/200 |
| 2005/0108516 A1 | 5/2005 | Balzer et al. | |
| 2005/0108562 A1 | 5/2005 | Khazan et al. | |
| 2005/0114672 A1 | 5/2005 | Duncan et al. | |
| 2005/0132346 A1* | 6/2005 | Tsantilis | 717/168 |
| 2005/0228990 A1 | 10/2005 | Kato et al. | 713/167 |
| 2005/0235360 A1 | 10/2005 | Pearson | |
| 2005/0257207 A1* | 11/2005 | Blumfield et al. | 717/168 |
| 2005/0260996 A1 | 11/2005 | Groenendaal | |
| 2005/0262558 A1 | 11/2005 | Usov | |
| 2005/0273858 A1 | 12/2005 | Zadok et al. | |
| 2005/0283823 A1 | 12/2005 | Okajo et al. | |
| 2005/0289071 A1* | 12/2005 | Goin et al. | 705/56 |
| 2005/0289538 A1* | 12/2005 | Black-Ziegelbein et al. | 717/177 |
| 2006/0004875 A1 | 1/2006 | Baron et al. | |
| 2006/0015501 A1 | 1/2006 | Sanamrad et al. | |
| 2006/0036591 A1* | 2/2006 | Gerasoulis et al. | 707/3 |
| 2006/0037016 A1* | 2/2006 | Saha et al. | 717/178 |
| 2006/0080656 A1 | 4/2006 | Cain et al. | |
| 2006/0085785 A1 | 4/2006 | Garrett | |
| 2006/0101277 A1 | 5/2006 | Meenan et al. | |
| 2006/0133223 A1 | 6/2006 | Nakamura et al. | |
| 2006/0136910 A1 | 6/2006 | Brickell et al. | |
| 2006/0136911 A1 | 6/2006 | Robinson et al. | |
| 2006/0195906 A1 | 8/2006 | Jin et al. | |
| 2006/0236398 A1 | 10/2006 | Trakic et al. | |
| 2007/0011746 A1 | 1/2007 | Malpani et al. | |
| 2007/0039049 A1 | 2/2007 | Kupferman et al. | |
| 2007/0050764 A1 | 3/2007 | Traut | |
| 2007/0074199 A1 | 3/2007 | Schoenberg | |
| 2007/0083522 A1 | 4/2007 | Nord et al. | |
| 2007/0101435 A1 | 5/2007 | Konanka et al. | |
| 2007/0136579 A1 | 6/2007 | Levy et al. | |
| 2007/0169079 A1* | 7/2007 | Keller et al. | 717/168 |
| 2007/0192329 A1 | 8/2007 | Croft et al. | |
| 2007/0220061 A1 | 9/2007 | Tirosh et al. | |
| 2007/0220507 A1* | 9/2007 | Back et al. | 717/170 |
| 2007/0253430 A1 | 11/2007 | Minami et al. | |
| 2007/0271561 A1 | 11/2007 | Winner et al. | |
| 2007/0300215 A1* | 12/2007 | Bardsley | 717/168 |
| 2008/0005737 A1 | 1/2008 | Saha et al. | |
| 2008/0005798 A1 | 1/2008 | Ross | |
| 2008/0010304 A1 | 1/2008 | Vempala et al. | |
| 2008/0034416 A1 | 2/2008 | Kumar et al. | |
| 2008/0052468 A1 | 2/2008 | Speirs et al. | |
| 2008/0082977 A1 | 4/2008 | Araujo et al. | |
| 2008/0120499 A1 | 5/2008 | Zimmer et al. | |
| 2008/0163207 A1 | 7/2008 | Reumann et al. | |
| 2008/0163210 A1 | 7/2008 | Bowman et al. | |
| 2008/0184373 A1 | 7/2008 | Traut et al. | |
| 2008/0294703 A1 | 11/2008 | Craft et al. | |
| 2008/0301770 A1 | 12/2008 | Kinder | |
| 2009/0038017 A1 | 2/2009 | Durham et al. | |
| 2009/0043993 A1 | 2/2009 | Ford et al. | |
| 2009/0144300 A1 | 6/2009 | Chatley et al. | |
| 2009/0150639 A1 | 6/2009 | Ohata | |
| 2009/0249438 A1 | 10/2009 | Litvin et al. | |
| 2010/0071035 A1 | 3/2010 | Budko et al. | |
| 2010/0100970 A1 | 4/2010 | Chowdhury et al. | |
| 2010/0114825 A1 | 5/2010 | Siddegowda | |
| 2010/0281133 A1 | 11/2010 | Brendel | |
| 2011/0035423 A1 | 2/2011 | Kobayashi et al. | |

FOREIGN PATENT DOCUMENTS

| | | |
|---|---|---|
| EP | 2 037 657 A1 | 3/2009 |
| WO | WO 98/44404 | 10/1998 |
| WO | WO 01/84285 A2 | 11/2001 |
| WO | WO 2006/012197 A2 | 2/2006 |
| WO | WO 2006/124832 A1 | 11/2006 |
| WO | WO 2008/054997 A2 | 5/2008 |
| WO | WO 2011/059877 | 5/2011 |
| WO | WO 2012/015485 | 2/2012 |
| WO | WO 2012/154890 | 2/2012 |

OTHER PUBLICATIONS

G. Pruett et al. "BladeCenter systems management software", [Online], Nov. 2005, pp. 963-975, [Retrieved from internet on Oct. 24, 2012], <http://citeseerx.ist.psu.edu/viewdoc/download?doi=10.1.1.91.5091&rep=rep1&type=pdf>.*

Philip M. Papadopoulos et al., "NPACI Rocks: tools and techniques for easily deploying manageable Linux clusters" [Online], Aug. 2002, pp. 707-725, [Retrieved from internet on Oct. 24, 2012], <http://onlinelibrary.wiley.com/doi/10.1002/cpe.722/pdf>.*

Thomas Staub et al., "Secure Remote Management and Software Distribution for Wireless Mesh Networks", [Online], Sep. 2007, pp. 1-8, [Retrieved from Internet on Oct. 24, 2012], <http://cds.unibe.ch/research/pub_files/B07.pdf>.*

U.S. Appl. No. 11/277,596, entitled "Execution Environment File Inventory," filed Mar. 27, 2006, Inventor(s): Rishi Bhargava et al.

U.S. Appl. No. 10/651,591, entitled "Method and System for Containment of Networked Application Client Software by Explicit Human Input," filed Aug. 29, 2003, Inventor(s): Rosen Sharma et al.

U.S. Appl. No. 10/806,578, entitled Containment of Network communication, filed Mar. 22, 2004, Inventor(s): E. John Sebes et al.

U.S. Appl. No. 10/739,230, entitled "Method and System for Containment of Usage of Lanugage Interfaces," filed Dec. 17, 2003, Inventor(s): Rosen Sharma et al.

U.S. Appl. No. 10/935,772, entitled "Solidifying the Executable Software Set of a Computer," filed Sep. 7, 2004, Inventor(s): E. John Sebes et al.

U.S. Appl. No. 11/060,683, entitled "Distribution and Installation of Solidified Software on a Computer," filed Feb. 16, 2005, Inventor(s): Bakul Shah et al.

U.S. Appl. No. 11/122,872, entitled "Piracy Prevention Using Unique Module Translation," filed May 4, 2005, Inventor(s): E. John Sebes et al.

U.S. Appl. No. 11/346,741, entitled "Enforcing Alignment of Approved Changes and Deployed Changes in the Software Change Life-Cycle," filed Feb. 2, 2006, Inventor(s): Rahul Roy-Chowdhury et al.

U.S. Appl. No. 11/182,320, entitled "Classification of Software on Networked Systems," filed Jul. 14, 2005, Inventor(s): E. John Sebes et al.

U.S. Appl. No. 11/400,085, entitled "Program-Based Authorization," filed Apr. 7, 2006, Inventor(s): Rishi Bhargava et al.

U.S. Appl. No. 11/437,317, entitled "Connectivity-Based Authorization," filed May 18, 2006, Inventor(s): E. John Sebes et al.

U.S. Appl. No. 12/290,380, entitled "Application Change Control," filed Oct. 29, 2008, Inventor(s): Rosen Sharma et al.

U.S. Appl. No. 12/008,274, entitled Method and Apparatus for Process Enforced Configuration Management, filed Jan. 9, 2008, Inventor(s): Rishi Bhargava et al.

U.S. Appl. No. 12/291,232, entitled "Method of and System for Computer System State Checks," filed Nov. 7, 2008, inventor(s): Rishi Bhargava et al.

U.S. Appl. No. 12/322,220, entitled "Method of and System for Malicious Software Detection Using Critical Address Space Protection," filed Jan. 29, 2009, Inventor(s): Suman Saraf et al.

U.S. Appl. No. 12/322,321, entitled "Method of and System for Computer System Denial-of-Service Protection," filed Jan. 29, 2009, Inventor(s): Suman Saraf et al.

U.S. Appl. No. 12/426,859, entitled "Method of and System for Reverse Mapping Vnode Pointers," filed Apr. 20, 2009, Inventor(s): Suman Saraf et al.

U.S. Appl. No. 12/545,609, entitled "System and Method for Enforcing Security Policies in a Virtual Environment," filed Aug. 21, 2009, Inventor(s): Amit Dang et al.

U.S. Appl. No. 12/545,745, entitled "System and Method for Providing Address Protection in a Virtual Environment," filed Aug. 21, 2009, Inventor(s): Preet Mohinder.

Eli M. Dow, et al., "The Xen Hypervisor," INFORMIT, dated Apr. 10, 2008, http://www.informit.com/articles/printerfriendly.aspx?p=1187966, printed Aug. 11, 2009 (13 pages).

"Xen Architecture Overview," Xen, dated Feb. 13, 2008, Version 1.2, http://wiki.xensource.com/xenwiki/XenArchitecture?action=AttachFile&do=get&target=Xen+architecture_Q1+2008.pdf, printed Aug. 18, 2009 (9 pages).

U.S. Appl. No. 12/551,673, entitled "Piracy Prevention Using Unique Module Translation," filed Sep. 1, 2009, Inventor(s): E. John Sebes et al.

U.S. Appl. No. 12/615,521, entitled "System and Method for Preventing Data Loss Using Virtual Machine Wrapped Applications," filed Nov. 10, 2009, Inventor(s): Sonali Agarwal, et al.

Desktop Management and Control, Website: http://www.vmware.com/solutions/desktop/, printed Oct. 12, 2009, 1 page.

Secure Mobile Computing, Website: http://www.vmware.com/solutions/desktop/mobile.html, printed Oct. 12, 2009, 2 pages.

U.S. Appl. No. 12/636,414, entitled "System and Method for Managing Virtual Machine Configurations," filed Dec. 11, 2009, Inventor(s): Harvinder Singh Sawhney, et al.

U.S. Appl. No. 12/839,856, entitled "Containment of Network Communication," filed Jul. 20, 2010, Inventor(s) E. John Sebes, et al.

U.S. Appl. No. 12/844,892, entitled "System and Method for Protecting Computer Networks Against Malicious Software," filed Jul. 28, 2010, Inventor(s) Rishi Bhargava, et al.

U.S. Appl. No. 12/844,964, entitled "System and Method for Network Level Protection Against Malicious Software," filed Jul. 28, 2010, Inventor(s) Rishi Bhargava, et al.

U.S. Appl. No. 12/880,125, entitled "System and Method for Clustering Host Inventories," filed Sep. 12, 2010, Inventor(s) Rishi Bhargava, et al.

U.S. Appl. No. 12/944,567, entitled "Classification of Software on Networked Systems," filed Nov. 11, 2010, Inventor(s) E. John Sebes, et al.

U.S. Appl. No. 12/903,993, entitled "Method and System for Containment of Usage of Language Interfaces," filed Oct. 13, 2010, Inventor(s) Rosen Sharma, et al.

U.S. Appl. No. 12/946,081, entitled "Method and System for Containment of Usage of Language Interfaces," Inventor(s) Rosen Sharma, et al., filed Nov. 15, 2010.

U.S. Appl. No. 12/946,344, entitled "Method and System for Containment of Usage of Language Interfaces," filed Nov. 15, 2010, Inventor(s) Rosen Sharma, et al.

Notification of International Preliminary Report on Patentability and Written Opinion mailed May 24, 2012 for International Application No. PCT/US2010/055520, 5 pages.

Sailer et al., sHype: Secure Hypervisor Approach to Trusted Virtualized Systems, IBM research Report, Feb. 2, 2005, 13 pages.

U.S. Appl. No. 13/558,181, entitled "Method and Apparatus for Process Enforced Configuration Management," filed Jul. 25, 2012, Inventor(s) Rishi Bhargava et al.

U.S. Appl. No. 13/558,227, entitled "Method and Apparatus for Process Enforced Configuration Management," filed Jul. 25, 2012, Inventor(s) Rishi Bhargava et al.

U.S. Appl. No. 13/558,277, entitled "Method and Apparatus for Process Enforced Configuration Management," filed Jul. 25, 2012, Inventor(s) Rishi Bhargava et al.

IA-32 Intel® Architecture Software Developer's Manual, vol. 3B; Jun. 2006; pp. 13, 15, 22 and 145-146.

* cited by examiner

SOFTWARE MODIFICATION BY GROUP TO MINIMIZE BREAKAGE

CROSS REFERENCE TO RELATED APPLICATIONS

This application is related to the following, all of which are incorporated herein by reference in their entirety:
co-pending U.S. patent application Ser. No. 10/651,591, entitled "Method And System For Containment of Networked Application Client Software By Explicit Human Input" and filed on Aug. 29, 2003;
U.S. patent application Ser. No. 10/651,588, entitled "Damage Containment By Translation" and filed on Aug. 29, 2003 (issued Dec. 9, 2008 as U.S. Pat. No. 7,464,408 on Dec. 9, 2008);
U.S. patent application Ser. No. 10/806,578, entitled "Containment Of Network Communication" and filed on Mar. 22, 2004 (issued Aug. 24, 2010 as U.S. Pat. No. 7,783,735);
U.S. patent application Ser. No. 10/935,772, entitled "Solidifying the Executable Software Set of a Computer" and filed on Sep. 7, 2004 (issued Jan. 18, 2011 as U.S. Pat. No. 7,873,955);
U.S. patent application Ser. No. 10/739,230, entitled "Method And System For Containment Of Usage Of Language Interfaces" and filed on Dec. 17, 2003 (issued Nov. 23, 2010 as U.S. Pat. No. 7,840,968);
U.S. patent application Ser. No. 11/060,683, entitled "Distribution and Installation of Solidified Software on a Computer" and filed on Feb. 16, 2005;
U.S. patent application Ser. No. 11/122,872, entitled "Piracy Prevention Using Unique Module Translation" and filed on May 4, 2005 (issued Oct. 13, 2009 as U.S. Pat. No. 7,603,552);
U.S. patent application Ser. No. 11/182,320, entitled "Classification of Software on Networked Systems" and filed on Jul. 14, 2005 (issued Dec. 21, 2010 as U.S. Pat. No. 7,856,661);
U.S. patent application Ser. No. 11/346,741, entitled "Enforcing Alignment of Approved Changes and Deployed Changes in the Software Change Life-Cycle" by Rahul Roy-Chowdhury, E. John Sebes and Jay Vaishnav, filed on Feb. 2, 2006 (issued Jul. 13, 2010 as U.S. Pat. No. 7,757,269);
U.S. patent application Ser. No. 11/277,596, entitled "Execution Environment File Inventory" by Rishi Bhargava and E. John Sebes, filed on Mar. 27, 2006 (issued Feb. 22, 2011 as U.S. Pat. No. 7,895,573); and
U.S. patent application Ser. No. 11/400,085, entitled "Program-Based Authorization" by Rishi Bhargava and E. John Sebes, filed on Apr. 7, 2006 (issued Jan. 11, 2011 as U.S. Pat. No. 7,895,573).

BACKGROUND

It is well-known that maintenance of software configurations on computers in an enterprise can be difficult. Many times, when modifications are made to existing software configurations, the existing software ceases to operate properly. Furthermore, different computers may have different operating systems (OS's), OS versions and/or OS patch sets. In addition, different computers may have different software applications, application versions and/or application patch sets.

As a result, when it is desired or necessary to perform what is nominally a global software modification—e.g., to install a new application—to minimize or avoid breakage, it becomes necessary to variously adjust the modification procedure to accommodate breakage caused by the various configurations.

SUMMARY OF THE INVENTION

A method is employed to group computers to facilitate application of a software modification to the computers. The method includes identifying a global set of computers to which it is desired to apply the software modification. Based on characteristics of software configurations of the computers of the identified global set, the computers of the identified global set are grouped into a plurality of clusters.

Grouping the computers into a plurality of clusters includes processing syntactic information about the computers to identify the plurality of clusters and applying the software modification to the computers of the clusters. The software modification is applied with an adjustment for each cluster in an attempt to avoid software breakage of the computers of that cluster.

DETAILED DESCRIPTION OF THE PREFERRED EMBODIMENTS

As discussed in the Background, due to the disparate configurations of the various computers in an enterprise, software configurations tend to break in different ways when it is attempted to make modifications to those software configurations. Thus, it is desirable to group the computers such that the same adjustment applied to a baseline software modification procedure relative to one computer in a group can be applied to other computers in the same group.

Figure 1:
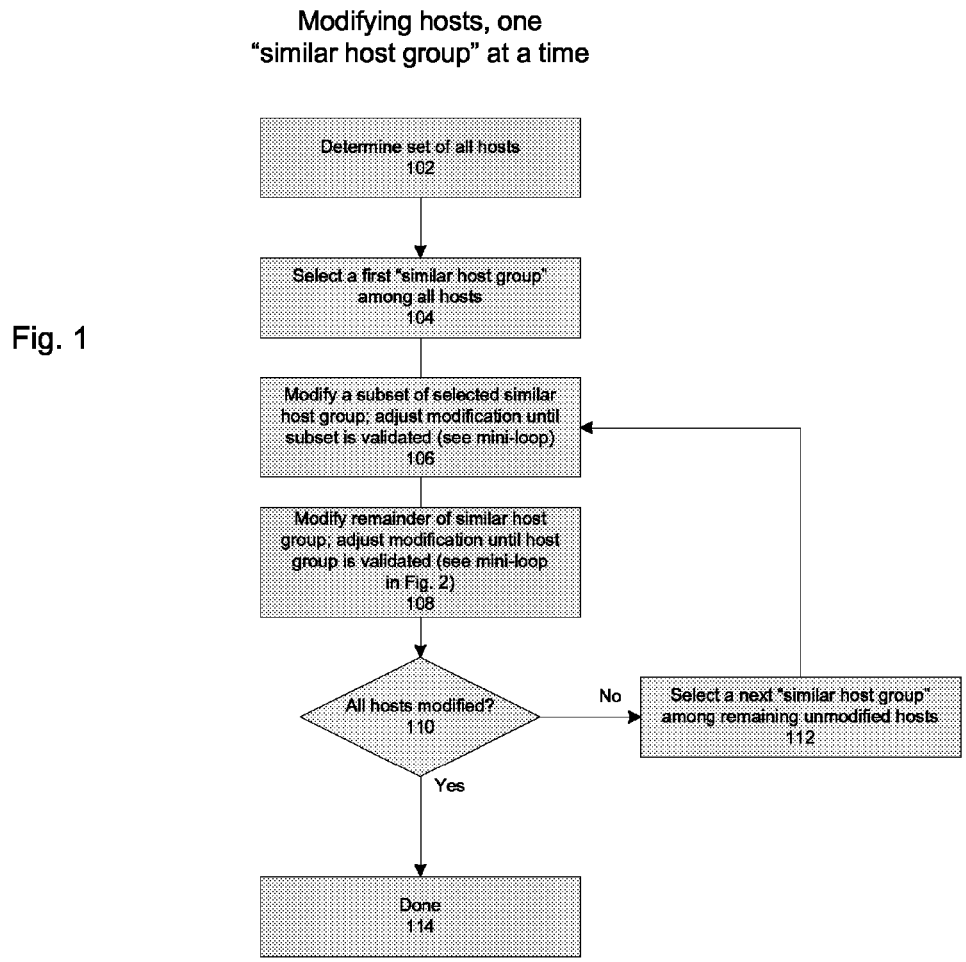
FIG. 1 is a flowchart illustrating a broad aspect of a method in which similar host are grouped, such that the same adjustment to a baseline software modification procedure can be applied to all of the computers in each group.

FIG. 1 is a flowchart illustrating a broad aspect of a method in which similar computers (more broadly, "hosts") are grouped, such that the same adjustment to a baseline software modification procedure can be applied to all of the computers in each group. Referring now to FIG. 1, at step 102, the set of all hosts is determined. That is, it is determined to which hosts the software modification procedure is to be applied. At step 104, a first "similar host group" is selected from the determined set of all hosts. We discuss later some examples of selecting a "similar host group."

At step 106, a subset of the first "similar host group" is processed. In particular, the hosts of the subset are modified using the baseline software modification procedure. As necessary, the baseline software modification procedure is adjusted, until the hosts of the subset can be validated as successfully modified. Step 106 may be performed in a "mini-loop" such as that shown in FIG. 2, and discussed below.

Continuing on, at step 108, the remainder of the first "similar host group" is modified using the baseline software modification procedure, nominally with the adjustment determined in step 106, but further adjusted as appropriate, so that the remainder of the hosts of the first "similar host group" can be validated. Step 108, also, may be performed in a "mini-loop" such as that shown in FIG. 2. It is not strictly necessary to modify every host in a similar host group, although that would represent the most thorough processing of the hosts. At any time, we can skip the host group that is currently being modified and move on to another group. Optionally, processing of different host groups can be parallelized as well.

At step 110, it is determined if all the hosts of the set (determined in step 102) have been modified (not counting any hosts that were intentionally left unmodified). If not, then, at step 112, a next "similar host group" is selected among the remaining unmodified hosts. For example, the next "similar host group" may be the set of remaining computers that is most similar to the first set, or the largest set of remaining computers that are most similar to each other, or the set that is most dissimilar to the first set. Steps 106, 108 and 110 are repeated for this selected next "similar host group." If it is determined at step 110 that all the hosts of the set have been modified, processing is complete at step 114.

In the above flow, if at any point we have modified a number of hosts such that either the current grouping is not useful for selecting the next hosts to be modified or a fresh grouping would possibly be more useful, we may optionally restart the grouping on the subset of the original set of hosts that are still unmodified. Furthermore, when a set of hosts is grouped, the grouping may be done multiple times according to different sets of parameters in order to see whether one particular choice of parameters produces a better grouping. As an example, such parameters may include: choosing to include or exclude particular types of semantic info; assigning different weights to different types of semantic or syntactic info; etc.

As a result of the FIG. 1 processing, wherein a software modification procedure is applied to similar groups of hosts, the process of adjusting the baseline software modification procedure, to accommodate differences in the hosts, is eased.

Figure 2:
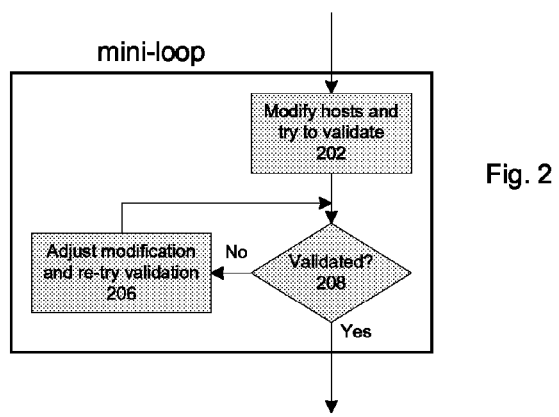
FIG. 2 illustrates a "mini-loop" in which the baseline software modification procedure for a subset of computers in a group is adjusted, until the hosts of the subset can be validated as successfully modified.

As mentioned above, FIG. 2 illustrates a "mini-loop" in which the baseline software modification procedure is adjusted, until the hosts of a subset of a similar host group can be validated as successfully modified. Referring to FIG. 2, at step 202, the hosts are modified and an attempt is made to validate the modification. At step 204, it is determined if the modification was successfully validated. If it is determined that the modification was not successfully validated, then at step 206, the modification is adjusted (e.g., taking into account the reason the modification was not successfully validated) and the validation is attempted again.

Figure 3:
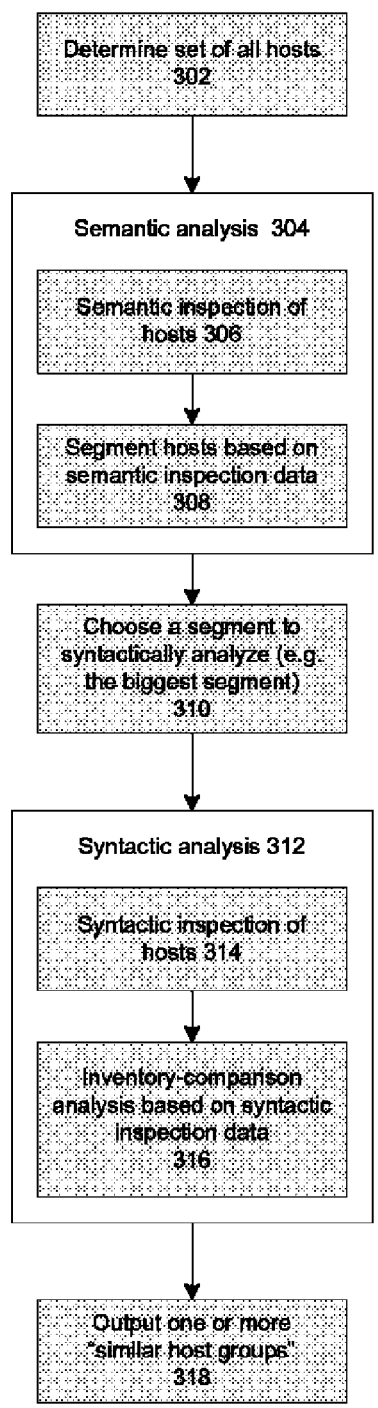
FIG. 3 is a flowchart illustrating an example of selecting the "similar host group".

Now, with reference to FIG. 3, we discuss an example of selecting the "similar host group." In the FIG. 3 example, once the set of all hosts is determined (step 302), a semantic analysis is applied (step 304) to segment hosts, followed by a syntactic analysis (step 312) on a chosen one of the segments (step 310) resulting from the semantic analysis.

With respect to step 302, this step is typically performed manually. Step 302 may also include providing meta-data for each computer that can be used in the segmenting step (step 308, discussed below). The meta-data may include, for example, the function/mission/line of business in which the computer is used or other attributes. The information is typically provided by people. Other meta-data may include an indication of priority/importance—i.e., an indication of which computers, or which applications on which computers, are more important than others.

Other meta-data may include an indication of the "validatability," which refers to the existence of validation test procedures for the software packages on a computer. For example, a computer that is not very validatable is one for which reliable validation test procedures are not known for its primary software packages and, therefore, cannot be thoroughly tested. By contrast, a very validatable host is one that has software packages for which validation testing has already been done and, therefore, it is known how to thoroughly validate and/or apply breakage workarounds. Intermediately, there are hosts for which there is some confidence that validation testing can be properly performed, but for which not all the validation testing has already been performed.

Generally, the semantic analysis (step 304) clusters the hosts based on properties of the hosts that are known or thought to be significant differentiators with regard to the software modification to be attempted. For example, a significant differentiator may be the operating system and/or software packages installed on each host, including the versions/patch-sets associated with the operating system and/or patch sets.

In general, then, a way is determined to clearly define the state of a computer, and then to define a notion of similarity between such states. One way to do this in a specific implementation is by considering the state of each computer to be a vector of atoms. An atom can represent one or more of, for example, installed OS version/patch; installed SW applications/versions/patch-sets; a computer group, of which the computer is a member (e.g., "accounting" or "web services"); a primary line-of-business of the computer; a flag indicating whether the computer performs a mission-critical task; and a ranking of the "validatability" of the host (an aggregate of "validatability" ranking of applicable atoms).

Other possible attributes of an atom include, for example, a weight to indicate level of importance of that atom; for what the atom indicates, an indication of whether it is of primary or secondary importance to the mission of the host; for what the atom indicates, an indication of variance based on total software inventory; for the software application that the atom indicates, identify validation test suites and/or test procedures (e.g., provided by vendor or developed for customer use during software maintenance cycles); and a ranking of the "validatability" for the software application that the atom indicates.

Referring still to FIG. 3, step 306 (within step 304) is a semantic inspection of the hosts. The information about the operating system and software packages, and the versions/patch-sets (e.g., the atom information) can generally be gathered automatically. The information may be obtainable by inspecting each software package itself or by querying the OS. In some examples, human input can be utilized as well, e.g., humans can indicate the names of the most important/critical software packages. Furthermore, it should be noted that the versions/patch-sets may not have been linearly applied.

Step 308 (within step 304) is a segmentation step. The operation of the segmenting step 308 is based at least on information gathered during the semantic inspection step 306. In particular, the population of hosts is segmented according to at least some of the semantic information. For example, the segmenting may be by operating system or by application or application groups. A segment may also be further segmented—e.g., first by operating system and then by application groups. The intent is to start on a segment that is the best starting point for the modification, and this starting segment can be chosen based on size, degree of similarity with the other segments, etc.

In a simple example, the segmenting step may be performed via a simple selection, based on individual computers in the population having or not having some attribute. For example, an operating system of a computer may be characterized by a micro-version. An OS micro-version is a naming representation of the OS name, version, and applied patch-sets (including service packs and similar upgrades) and optionally representing the install order of the patch-sets. An application micro-version is defined similarly.

Micro-versions can provide a fast and accurate similarity measure for a set of computers, and test-equivalence classes can be realized simply by grouping computers with the same OS micro-versions together, and optionally also sub-grouping by application micro-versions. It is thought that this approach works particularly well for a larger host population having some micro-versions that occur frequently, such as in a centrally managed IT dept where operating systems, applications and patch-sets are applied in the same order to many computers.

Turning again to a more general discussion of the segmenting step 308, a segment may be relatively simplistically determined by using one attribute value (e.g., a specific OS "micro-version"), and every computer having that value of the attribute falls within a particular segment, with all other computers falling outside that particular segment. On the other hand, a segment may be relatively complexly determined by providing many attribute values to a cluster-analysis algorithm—for example with inputs being the OS/SW micro-versions or other attributes, and the outputs being the segments (also known as "clusters" with respect to cluster analysis algorithms). Generally, the segmentation of step 308 does not use information gathered in the syntactic inspection step 314.

The result of the segmenting step 308 is one or more segments, and possibly some outliers, which are a subset of "all hosts" (determined in step 302) and represent similar hosts. The value of the segmentation step is that it can minimize or prevent mis-clustering of hosts (e.g., based on the gathered syntactic information from step 314), where it is known from the semantic information that the hosts are in fact very dissimilar and are advantageously not clustered together. An example of this is two computers that are 90% similar, but where the 10% difference actually represents different operating systems and, hence, the computers are fundamentally dissimilar for the purposes of applying the software modification.

As mentioned above, the syntactic analysis (312) is performed on one segment at a time—the segment chosen in step 310. (In some cases, for example, where no segments were identified, then the syntactic analysis (312) is performed on all of the hosts.) Step 314 is an information gathering step, to obtain syntactic information about the hosts of the segment on which the syntactic analysis 312 is being performed. The syntactic information may be present, for example, in an inventory of information about files (and, more generally, containers) accessible by each host. For example, application Ser. No. 11/277,596 describes a method to maintain an inventory of such information for one or more hosts.

In the inventory-comparison analysis step 316 of the syntactic analysis, an indication of a set of clusters is determined. The clusters are "test-equivalence classes" representing hosts deemed to be syntactically similar, based on the syntactic information about the hosts. There may also be some outliers that were determined to not fit into any of the clusters.

In some examples, the semantic analysis step 304 is not performed, with reliance for clustering being entirely on syntactic information in the syntactic analysis step 312. For example, the set of operating system files (or, as appropriate, other files or characteristics that are determined to affect what adjustments to make to the baseline software modification procedure) can be used as the primary "clustering key" in the inventory comparison analysis step 316 of the syntactic analysis step 312. However, it is difficult in many instances to determine which files are operating system files and which files are "other" files. For example, with the Windows operating system, it can be difficult to distinguish between where the operating system ends and the applications start.

On the other hand, the reader may be considering why the syntactic analysis step 312 is employed at all, after the segmentation output of the semantic analysis step 304. In general, as discussed in the previous paragraph, the information that most affects the adjustments to make to the baseline software modification procedure is the syntactic information. In general, however, the semantic analysis step 304 is helpful, for example, to minimize the occurrence of mis-clustering of computers that are in fact very dissimilar. Finally, at step 318, a set of one or more similar host groups is provided.

Figure 4A:
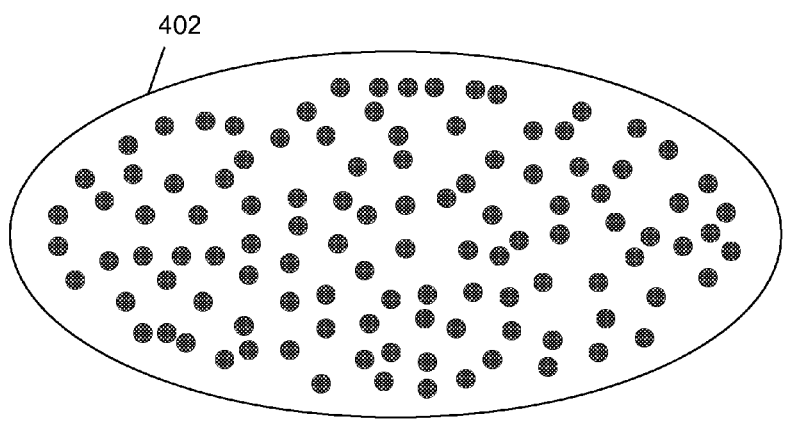
FIGS. 4a to 4c graphically illustrate example output at various stages of the FIG. 3 processing.
Figure 4B:
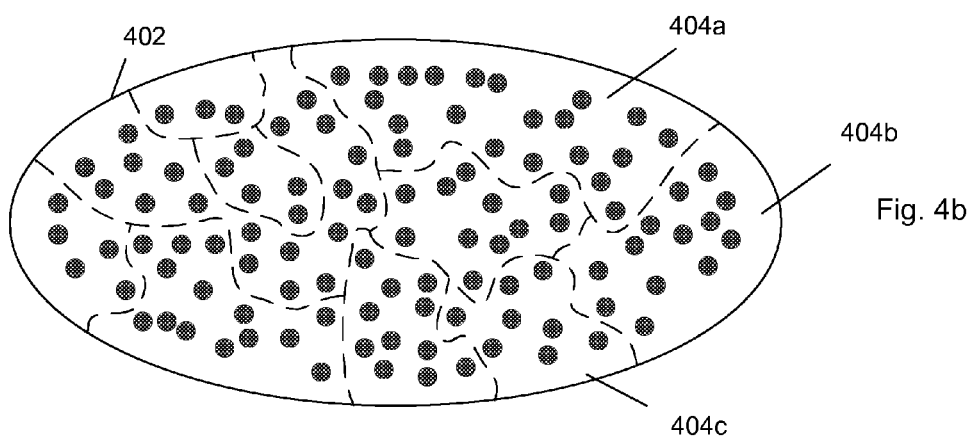
Figure 4C:
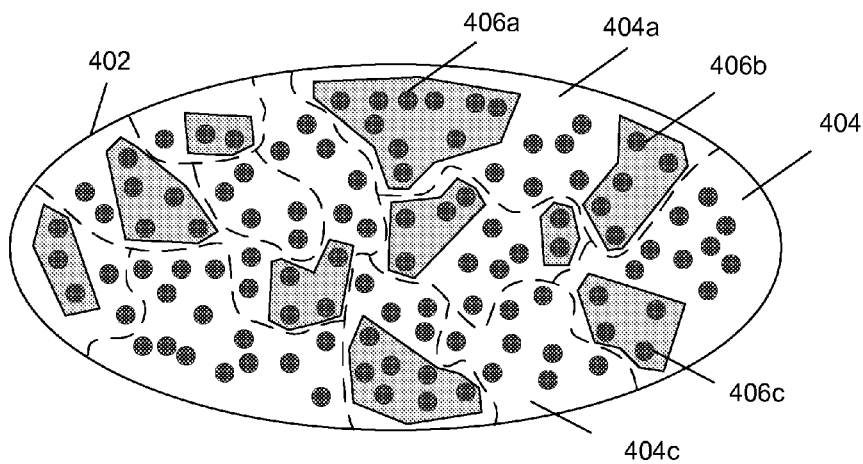

FIGS. 4a, 4b and 4c graphically illustrate example output at various stages of the FIG. 3 processing to determine one or more "similar host groups." Specifically, FIGS. 4a, 4b and 4c graphically illustrate, respectively, an example output of step 302 (determine all hosts) in FIG. 3, of step 304 (semantic analysis), and of step 312 (syntactic analysis). Referring to FIG. 4a, this figure illustrates a set 402 of all hosts. FIG. 4b illustrates the set 402 of all hosts divided into segments (e.g., including segments 404a, 404b and 404c, as well as other segments). FIG. 4c illustrates the hosts of some segments being clustered into "similar host groups" as a result of the syntactic analysis step. For example, segment 404a includes groups 406a and 406b; and segment 404b includes group 406c.

It is noted, with reference to FIGS. 4a to 4c, that the semantic analysis step 304 may be entirely performed before starting the syntactic analysis step 312 but, in some examples, portions of the semantic analysis step 304 and the syntactic analysis step 312 are interleaved.

In summary, then, by intelligently grouping computers in a manner that is likely to correlate to the manner in which a baseline software modification procedure may be adjusted to avoid breakage, administration of a software modification to computers of an enterprise may be simplified.

What is claimed is:

1. A method implemented by executing instructions stored in a memory of a computer, the method comprising:
   identifying a global set of hosts, comprising computers, to which it is desired to apply a software modification;
   segmenting the hosts based on a semantic analysis of attributes selected from an attribute group including operating system name, operating system version, operating system patch-sets, and installed software applications, such that hosts in each segment share at least one attribute;
   selecting a segment to syntactically analyze;
   grouping the hosts of the selected segment into a plurality of clusters, wherein grouping the hosts into a plurality of clusters includes processing syntactic information about the hosts in the selected segment to identify the plurality of clusters, wherein the syntactic information is obtained from an inventory of information about files accessible by each host, and wherein the syntactic information is different from the attributes;
   repeating the selecting the segment and the grouping until substantially all hosts in the global set of hosts have been grouped;
   selecting a cluster of hosts; and applying the software modification to the selected cluster of hosts using a baseline software modification procedure, wherein the applying comprises:

selecting a subset of hosts in the selected cluster of hosts;

attempting to modify the hosts in the subset using the baseline software modification procedure;

if the attempt is not successful, adjusting the baseline software modification procedure until the modification is successful, wherein the adjusting includes:

modifying at least one host of the selected cluster with an adjustment to the baseline software modification procedure, wherein the adjustment is determined by:

applying a nominal version of the software modification to the at least one host according to the baseline software modification procedure;

testing to determine whether the software modification is successful;

adjusting the baseline software modification procedure; and repeating the testing and adjusting step until it is determined that the software modification is successfully applied on the at least one host;

determining whether the modified host operates according to desired characteristics;

based on determining that the modified host does not operate according to the desired characteristics, updating the adjustment; and repeating the modifying, determining and adjustment updating step on the at least one host; and repeating the selecting, attempting, and adjusting, until all hosts in the selected cluster of hosts have been modified with the software modification.

2. The method of claim 1, further comprising:

obtaining the semantic information.

3. The method of claim 2, wherein:

obtaining the semantic information includes obtaining the semantic information based on human input.

4. The method of claim 3, wherein:

the semantic information based on human input includes characterization of how the hosts are used.

5. The method of claim 4, wherein:

the characterization of how the hosts are used includes a characterization of importance of the hosts or applications on the hosts.

6. The method of claim 3, wherein:

the semantic information based on human input includes a characterization of validatability.

7. The method of claim 1, wherein:

the steps of segmenting the hosts and grouping the hosts into a plurality of clusters are at least partially interleaved.

8. The method of claim 1, wherein:

adjusting the baseline software modification procedure further comprises repeating the modifying, determining and adjustment updating step for other hosts of that cluster, other than the at least one host of that cluster.

9. The method of claim 1, wherein:

the adjustment is initially a null adjustment.

10. The method of claim 1, wherein:

the semantic information about each host includes information about types of software present on that host.

11. The method of claim 10, wherein:

the information about types of software present on that host include information about the operating system and applications present on that host.

12. The method of claim 11, wherein:

the information about operating system and applications present on that host includes an indication of a version, including patch sets.

13. The method of claim 1, further comprising:

repeating the selecting the cluster of hosts and applying the software modification until all hosts in the global set of hosts have been modified with the software modification.

* * * * *